United States Patent
Jung et al.

(12)
(10) Patent No.: US 6,372,341 B1
(45) Date of Patent: *Apr. 16, 2002

(54) TAMPA-INDICATING ARTICLE FOR REUSABLE SUBSTRATES

(75) Inventors: Dieter Jung, Moers; Pauline E. Ludwig, Duesseldorf, both of (DE)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,250

(22) Filed: Apr. 27, 1998

(51) Int. Cl.⁷ .................................................. C09J 7/02
(52) U.S. Cl. ........................ 428/354; 428/915; 428/916
(58) Field of Search .......................... 428/354, 355 RA, 428/915, 916

(56) References Cited

U.S. PATENT DOCUMENTS

| | | | |
|---|---|---|---|
| 2,407,680 A | 9/1946 | Palmquist et al. | 88/82 |
| 2,420,045 A | 5/1947 | Krug | 40/2 |
| 3,700,305 A | 10/1972 | Bingham | 350/105 |
| 4,024,312 A | 5/1977 | Korpman | 428/343 |
| 4,200,875 A | 4/1980 | Galanos | 346/1.1 |
| 4,310,137 A | 1/1982 | Frye | 248/467 |
| 4,688,894 A | 8/1987 | Hockert | 350/105 |
| 4,714,656 A | 12/1987 | Bradshaw et al. | 428/411.1 |
| 4,856,857 A | 8/1989 | Takeuchi et al. | 350/3.6 |
| 5,080,463 A | 1/1992 | Fayish et al. | 359/536 |
| 5,153,042 A | 10/1992 | Indrelie | 428/40 |
| 5,169,707 A | 12/1992 | Faykish et al. | 428/195 |
| 5,277,971 A | 1/1994 | Weng et al. | 428/343 |
| 5,314,557 A | 5/1994 | Schwartz et al. | 156/229 |
| 5,370,763 A | 12/1994 | Curiel | 156/277 |
| 5,508,105 A | 4/1996 | Orensteen et al. | 428/323 |
| 5,516,581 A | 5/1996 | Kreckel et al. | 428/317.3 |
| 5,582,434 A | 12/1996 | Skov et al. | 283/81 |
| 5,629,093 A | 5/1997 | Bischof et al. | 428/411.1 |
| 5,634,670 A | 6/1997 | Orensteen et al. | 283/81 |
| 5,656,360 A | 8/1997 | Faykish et al. | 428/195 |
| 5,670,005 A | 9/1997 | Look et al. | 156/230 |
| 5,672,402 A | 9/1997 | Kreckel et al. | 428/34.2 |

FOREIGN PATENT DOCUMENTS

| | | | |
|---|---|---|---|
| DE | 33 31 016 | 4/1983 | C09J/5/00 |
| EP | 0 328 086 | 8/1989 | G06K/19/06 |
| EP | 0 651 365 | 5/1995 | G09F/3/02 |
| EP | 0 755 776 | 1/1997 | B32B/27/08 |
| GB | 2 194 932 | 3/1988 | G09F/3/03 |
| WO | WO 92/11332 | 8/1992 | C09J/7/02 |
| WO | WO 92/11333 | 9/1992 | C09J/7/02 |
| WO | WO 93/01979 | 2/1993 | B65B/13/02 |
| WO | WO 93/16888 | 9/1993 | B44C/1/17 |
| WO | WO 94/16950 | 8/1994 | B65B/13/02 |
| WO | WO 95/06691 | 3/1995 | C09J/7/02 |
| WO | WO 95/29474 | 11/1995 | G09F/3/02 |
| WO | WO 96/14992 | 5/1996 | B42D/15/00 |
| WO | WO 97/44769 | 11/1997 | G09F/1/00 |
| WO | WO 98/01779 | 1/1998 | G02B/5/128 |

OTHER PUBLICATIONS

English Language Abstract.

*Primary Examiner*—Daniel Zirker
(74) *Attorney, Agent, or Firm*—Lucy C. Weiss

(57) ABSTRACT

A tamper-indicating article comprises (a) a pressure-sensitive adhesive film or pressure-sensitive adhesive-coated tape that can be removed, without exhibiting cohesive failure, from a substrate surface (e.g., an automobile windshield) by stretching the film or tape; and (b) at least one damageable layer that shows cohesive or intralayer failure when an attempt is made to remove the article from the substrate surface. The article is especially useful for application to valuable, non-disposable substrates and can be removed therefrom without substrate damage.

32 Claims, 1 Drawing Sheet

TAMPA-INDICATING ARTICLE FOR REUSABLE SUBSTRATES

FIELD OF THE INVENTION

This invention relates to pressure-sensitive adhesive coated, tamper-indicating articles.

BACKGROUND OF THE INVENTION

A variety of pressure-sensitive adhesive coated articles, e.g., labels and stickers, have been developed to provide visual evidence of tampering. Generally, the articles have been designed to leave a tenaciously-adhered, residual indication of tampering on substrate surfaces. Such articles and/or their residues can be removed only with the aid of solvents and/or mechanical scraping, which can damage substrate surfaces.

Thus, for valuable substrates (i.e., non-disposable, reusable substrates such as automobile windshields), there is a need in the art for an article that displays permanent evidence of tampering when any attempt is made to remove it from the substrate, but that either does not leave any residue upon removal or provides a residue that is removable without the aid of solvents or mechanical scraping. Such an article should exhibit sufficiently high adhesion to the substrate to enable it to remain adhered during normal use conditions and should provide sufficient indication of tampering to render it non-transferable (e.g., to another vehicle).

SUMMARY OF THE INVENTION

Briefly, in one aspect, this invention provides a tamper-indicating article for use on valuable, i.e., non-disposable or reusable, substrates. The article comprises (a) a pressure-sensitive adhesive film or pressure-sensitive adhesive-coated tape that can be removed, without exhibiting cohesive failure, from a substrate surface (e.g., an automobile windshield) by stretching the film or tape; and (b) at least one damageable layer that shows cohesive or intralayer failure when an attempt is made to remove the article from the substrate surface. Preferably, component (b) comprises indicia and/or a holographic layer, and component (a) comprises a pressure-sensitive adhesive film or pressure-sensitive adhesive-coated tape that can be removed by stretching at an angle of about 45 degrees to the substrate surface. The article also preferably further comprises a retroreflective layer.

The tamper-indicating features of the article of the invention derive from the incorporation of a damageable layer, e.g., a layer that is destructible (in whole or in part) or that is irreversibly deformable. The cohesive strength of this layer (component (b)) is less than the adhesive strength between component (a) and the substrate, and this adhesive strength is less than the cohesive strength of component (a). The article thus remains durably bonded to a substrate surface under normal use conditions. However, an attempt to forcibly remove the article from the substrate results in the cohesive or intralayer failure of component (b), accompanied by the separation of components (a) and (b). Component (a) remains substantially intact and bonded to the substrate surface. The article thereby provides sufficient indication of tampering to render it non-transferable to another substrate.

Although the tamper-indicating article of the invention can be used on a wide variety of substrates, it is especially useful for application to substrates that are not single-use, disposable substrates but rather that are valuable substrates for which continuous or repeated use is desired. An attempt to remove the article from a substrate will activate its tamper-indicating features, yet the portion of the article remaining on the substrate (after activation) can be easily and completely removed without the need for chemical agents (e.g., organic solvents) or mechanical tools (e.g., knives or scrapers). The prior art problem of substrate damage is thereby avoided. Thus, the article is particularly useful as a security label for a vehicle window, bumper, or license plate; as a closure seal for brief cases, computer disc drives, doors, and filing cabinets; and as a security label for identification cards and other documents.

In another aspect, this invention also provides a substrate bearing the tamper-indicating article of the invention.

BRIEF DESCRIPTION OF THE DRAWINGS

These and other features, aspects, and advantages of the present invention will become better understood with regard to the following description, appended claims, and accompanying drawings, wherein:

Figure 1:
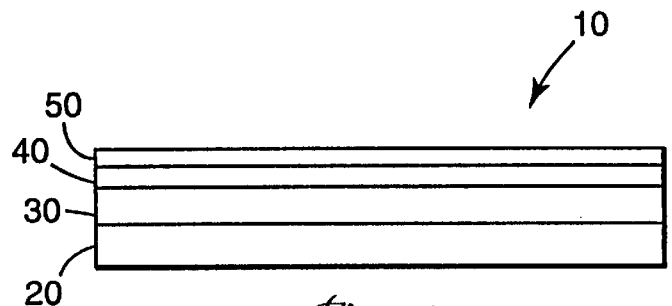
FIGS. 1 and 2 show sectional views of two embodiments of the tamper-indicating article of the invention.

These figures, which are idealized, are not drawn to scale and are intended to be merely illustrative and nonlimiting.

DETAILED DESCRIPTION OF THE INVENTION

| Reference Numerals | |
|---|---|
| 10 | Tamper-indicating Article |
| 20, 40 | Pressure-sensitive Adhesive(s) |
| 30 | Carrier |
| 50, 55 | Damageable Layers |
| 60 | Patterned Release Coating |
| 70 | Primer |
| 80 | Retroreflective Layer |
| 90 | Substrate |

Component (a): Pressure-sensitive Adhesive Film or Tape

Figure 2:
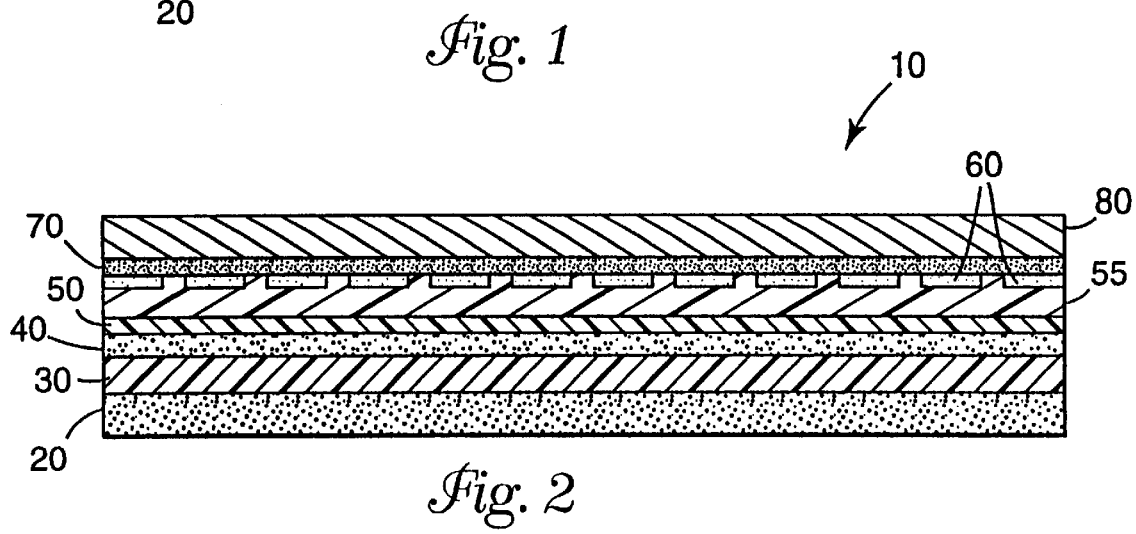

Component (a) of the tamper-indicating article of the invention can be better understood by reference to the accompanying drawings, where FIGS. 1 and 2 show embodiments of the article 10 of the invention wherein a double-coated tape functions as component (a) of the article. The double-coated tape comprises a carrier 30 bearing a pressure-sensitive adhesive 20 on at least a portion of a first major surface thereof and a pressure-sensitive adhesive 40 on at least a portion of a second major surface thereof. The pressure-sensitive adhesives (PSAs) 20 and 40 can be the same or different in composition, depending upon the natures of the substrate and component (b). The PSAs are, for at least some embodiments, preferably chosen so as to provide a bond to the substrate that is of greater adhesive strength than the bond between components (a) and (b). Alternatively, a film of PSA (or even a single-coated PSA tape having a carrier that is capable of adhering to component (b)) can be used instead of a double-coated tape as component (a), provided that the film (or single-coated tape) can be designed to provide the appropriate adhesive strengths for a particular application.

Suitable PSA-coated tapes and PSA films for use in preparing the article of the invention are those which can be removed, without exhibiting cohesive failure, from a substrate surface by stretching. Useful PSAs include those acrylic PSAs, block copolymer PSAs, rubber resin PSAs, poly(alpha olefin) PSAS, and silicone PSAs that exhibit sufficient adhesion to a selected substrate to provide a bond that is durable under normal use conditions and sufficient stretchiness and cohesive strength (alone and/or in combination with a carrier) to be cleanly removable from the substrate by stretching. Acrylic PSAs and silicone PSAs are generally preferred due to their light-transmissive (more preferably, transparency) characteristics, with acrylic PSAs being more preferred.

Optionally, the PSA layer(s) can contain one or more additives such as tackifying resins, plasticizers, antioxidants, fillers, and other common additives, depending upon the particular application.

Suitable carriers for the PSA include both elastic and inelastic polymeric films (preferably, light-transmissive films; more preferably, transparent films) that exhibit sufficient stretchiness (an appropriate Young's modulus to be manually stretchable) and tensile strength to enable the tape to be removed from a substrate surface by stretching the tape manually and without rupture of the carrier during removal. Representative examples of suitable polymer films include polyolefins, e.g., polyethylene, polypropylene, and polybutylene; vinyl polymers, e.g., poly(vinyl chloride) and poly (vinyl acetate); acrylic polymers; silicone polymers; natural or synthetic rubbers; polyurethanes; and blends thereof. Copolymers, e.g., ethylene/methacrylate, ethylene/vinyl acetate, acrylonitrile/butadiene/styrene, ethylene/propylene, and block copolymers (e.g., styrene-isoprene-styrene (SIS) or styrene-ethylene-butylene-styrene (SEBS)) can also be utilized. Polyolefins, especially polyethylene and polypropylene, and block copolymers are preferred, with linear low density polyethylene, low density polyethylene, and SIS and SEBS block copolymers being more preferred. Linear low density polyethylene is most preferred.

If desired, the carrier can be treated or its composition modified so as to enhance its adhesion to the PSA(s). For example, the carrier can be corona- or electron beam-treated or coated with an adhesion-promoting composition, or, alternatively, the carrier can contain added adhesion-promoting compounds or chemical groups. The carrier can also contain other types of additives, e.g., fillers, tackifiers, or plasticizers.

Preferred PSA-coated tapes and PSA films for use as component (a) are those which can be cleanly removed from a substrate by stretching in a direction substantially parallel to the substrate surface. Such tapes and films are described, e.g., in DE 3,331,016 (Beiersdorf AG), U.S. Pat. No. 4,024,312 (Korpman), and U.S. Pat. No. 5,516,581 (Kreckel et al.), the descriptions of which are incorporated herein by reference. DE 3,331,016 discloses an adhesive film comprising a tackified block copolymer PSA and exhibiting high elasticity, low plasticity, greater cohesion than adhesion, adhesive strength that diminishes upon stretching, and a ratio of removal force to rupture force of 1:2 or larger. U.S. Pat. No. 4,024,312 describes a tape comprising a rubber resin PSA or a tackified block copolymer PSA and a highly extensible and elastic block copolymer carrier exhibiting a lengthwise elongation at break of at least about 200 percent and a 50 percent rubber modulus of not above about 2,000 pounds per square inch (13.8 N/mm$^2$).

An especially preferred tape for use as component (a) is the removable adhesive tape disclosed in U.S. Pat. No. 5,516,581. This tape comprises a highly extensible and substantially inelastic carrier and a layer of PSA. The carrier has a tensile strength at break that is sufficiently high that the carrier does not rupture during removal of the tape from a substrate surface (e.g., a tensile strength at break of preferably at least about 4300 pounds per square inch (psi) (29.6 N/mm$^2$), more preferably at least about 5300 psi (36.5 N/mm$^2$), most preferably at least about 6300 psi (43.4 N/mm$^2$)). The carrier also has a lengthwise elongation at break of from about 50 to about 1200 percent (preferably from about 150 to about 700 percent, more preferably from about 350 to about 700 percent), with less than about 50 percent elastic recovery after stretching (preferably, less than about 30 percent, more preferably, less than about 20 percent), and a Young's modulus of at least about 2500 psi (17.2 N/mm$^2$) (preferably, at least about 3000 psi (20.7 N/mm$^2$)) but less than about 72,500 psi (500 N/mm$^2$) (preferably, less than about 50,000 psi (345 N/mm$^2$), more preferably, between about 5000 and about 30,000 psi (between about 34.5 and about 207 N/mm$^2$)). The PSA is preferably highly extensible, does not separate from the carrier during stretching, and has higher cohesion than adhesion to any suitable substrate. After being applied to a substrate, the adhesive tape becomes firmly bonded, but can be easily removed without damaging the substrate by simply stretching it, preferably at an angle of about 45 degrees to the substrate surface, more preferably in a direction substantially parallel, e.g., less than about 35 degrees (preferably, less than about 30 degrees, more preferably, less than about 10 degrees), to the substrate surface.

Component (b): Damageable Layer(s)

Component (b) of the tamper-indicating article of the invention can be better understood by reference to the accompanying drawings, where FIGS. 1 and 2 show embodiments of the article 10 of the invention wherein component (b), comprising at least one damageable layer, is bonded to component (a) through contact with pressure-sensitive adhesive 40. In the embodiment of FIG. 1, damageable layer 50 (a paper layer, optionally bearing a patterned release coating) serves as component (b). FIG. 2 shows a preferred embodiment of the article 10 of the invention wherein damageable layers 50 (indicia comprising ink) and 55 (a holographic film) together constitute component (b).

In general, the damageable layer has a limited cohesive strength and is the weakest layer in the multi-layer article. It is thus the predetermined failure point of the article upon attempted removal of the article from a substrate. The damageable layer can comprise a frangible material that breaks during tampering (e.g., a metallized or non-metallized holographic film such as those described in EP 253,089 (LGZ Landis & Gyr Zug AG), EP 328,086 (American Bank Note Holographics, Inc.), EP 401,466 (Landis & Gyr Betriebs AG),and U.S. Pat. No. 4,856,857 (Takeuchi et al.), the descriptions of which are incorporated herein by reference, or an acrylic resin that optionally contains ceramic microspheres); a paper (e.g., as shown in FIG. 1), wherein the internal strength and thickness of the paper are chosen so that the paper layer exhibits intralayer failure upon article removal; indicia (e.g., comprising ink, as in FIG. 2) applied to an internal layer by any of a variety of methods including, e.g., transfer processes and direct printing processes such as thermal transfer printing, ink-jet printing, laser printing, flexographic printing, gravure printing, and screen printing; and any other types of layers that are capable of being destroyed (in whole or in part) or irreversibly deformed during attempted article removal. Such layers can comprise, e.g., a hot-melt adhesive, a pressure-sensitive adhesive, and/or an irreversibly deformable polymeric film. Preferred damageable layers are light-transmissive (more preferably, transparent).

Preferably, the article of the invention includes (as a damageable layer) a holographic film, e.g., one which comprises a structured sublayer and an optional reflective sublayer. The structured sublayer can be formed by several methods that are well known in the art, e.g., as described in U.S. Pat. No. 4,856,857 (Takeuchi et al.), the descriptions of which are incorporated herein by reference. It can be made of materials such as polymethyl methacrylate (PMMA), nitrocellulose, and polystyrene. The structured sublayer can include a microstructured relief pattern of holographic or diffraction grating images in the form of logos or patterns that reflect light. In one embodiment, an embossed microstructured sublayer can be formed by contacting the material from which the structured sublayer will be made with a non-deformable embossing plate having a microstructured relief pattern, and applying heat and pressure. Alternatively, the structured sublayer can be made by any other suitable process such as radiation curing, and can be made of materials such as urethane, epoxy, polyester, and acrylic monomers and oligomers, which are formulated with photoinitiators, cast on a non-deformable tool having a micro-structured relief pattern, and radiation cured.

An optional reflective sublayer can be coated on the structured sublayer either before or after embossing. The reflective sublayer preferably has a higher refractive index than the structured sublayer. In a preferred embodiment, the reflective sublayer is substantially transparent and colorless. Illustrative examples of suitable reflective sublayer materials include but are not limited to bismuth trioxide, zinc sulfide, titanium dioxide, and zirconium oxide, which are described in U.S. Pat. No. 4,856,857 (Takeuchi et al.), the description of which is incorporated herein by reference. Less transparent materials such as thin aluminum or silver or patterned reflectors can also be used. The reflective sublayer enhances the reflection of light through the structured sublayer due to the difference in refractive index between the structured and reflective sublayers. Thus, the structured holographic pattern is more readily visible to the unaided eye once the reflective sublayer is coated on the structured sublayer, and, if desired, an adhesive or adhesion-promoting primer can be directly applied to the structured sublayer without diminishing the visibility of the structured pattern.

The article of the invention can comprise more than one damageable layer, as shown in FIG. 2 where both indicia and a holographic film are utilized and where pressure-sensitive adhesive 40 can also serve as a damageable layer if it is selected so as to have low cohesive strength. The failure pattern of multi-layer articles such as the article of the invention is complex and dependent upon various parameters, such as the elasticity or brittleness of the various layers, the tensile strength of the materials used, the adhesion between adjacent layers, the thicknesses of the layers, and the pattern of any discontinuous layers, as well as upon the removal direction, angle, force, and speed and the temperature during removal. Thus, in some cases, removal of the article from a substrate may result in failure at points other than, or in addition to, the pre-selected damageable layer(s) of the article.

Generally, however, the damageable layer(s) of the article fail and thereby provide a permanent indication of tampering. This failure can be better understood by reference to FIG. 3, which shows a sectional view of the preferred embodiment of FIG. 2 after application to a substrate 90 and subsequent activation of the article's tamper-indicating features upon attempted removal from the substrate.

Additional Components

Figure 3:
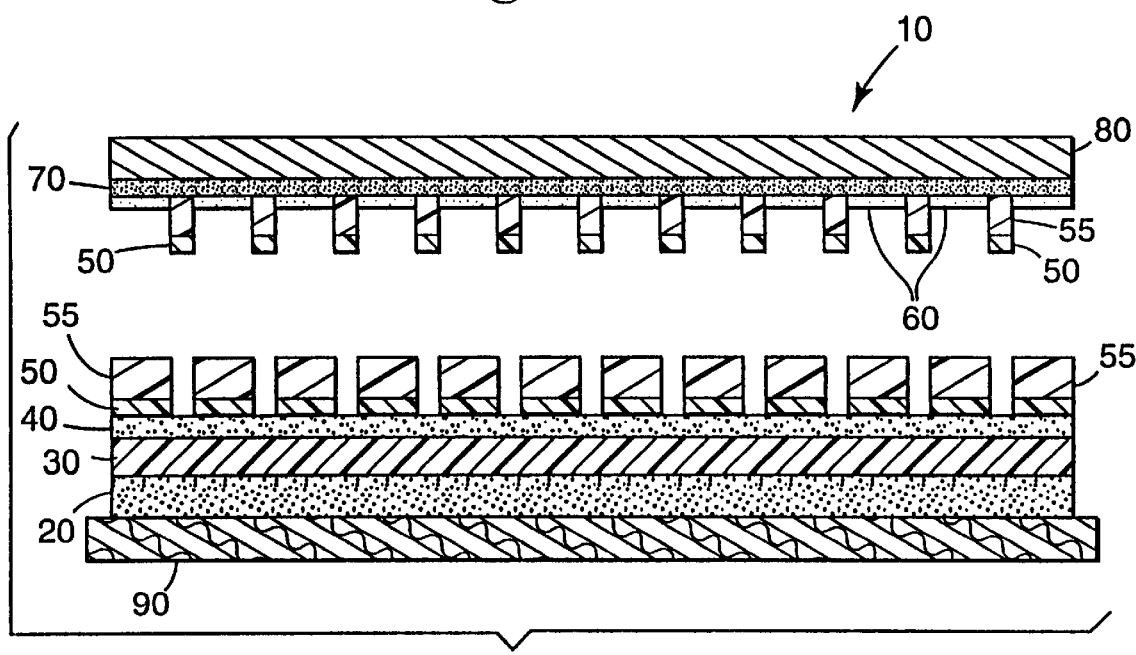
FIG. 3 shows a sectional view of the embodiment of FIG. 2 after application to a substrate and subsequent activation of the embodiment's tamper-indicating features upon attempted removal from the substrate.

In addition to damageable layers 50 (indicia) and 55 (holographic film), the embodiment of FIGS. 2 and 3 (a preferred embodiment) further comprises a patterned release coating 60, a primer coating 70, and a retroreflective layer 80. The patterned release coating 60 (which can be of any of the types known in the art, e.g., silicone-based compositions, fluorinated chemicals, waxes, and polyvinyl alcohol, and can be of any of the known patterns) and the primer coating 70 (which can also be selected from known primer coatings and treatments, e.g., of the types described above for use on the carrier) serve to provide areas of greater and lesser adhesion of the holographic film 55 (bearing indicia 50) to the underlying retroreflective layer 80. Thus, upon attempted removal of the article from a substrate, the indicia-bearing holographic film breaks, with portions of the film and indicia remaining with component (a) (bonded to pressure-sensitive adhesive 40) and portions remaining bonded to retroreflective layer 80. The relative sizes and spacings of the portions remaining with component (a) and with the retroreflective layer, respectively, can be varied by varying the nature of the pattern (of the patterned release coating) and the extent of surface coverage, as is known in the art.

As shown in FIGS. 2 and 3, preferred embodiments of the article of the invention comprise a retroreflective layer 80, which preferably comprises microparticles or cube corner elements. For example, the retroreflective layer, as described in U.S. Pat. No. 2,407,680 (Palmquist et al.), the description of which is incorporated herein by reference, can comprise an enclosed monolayer of glass microspheres that are coated in a spacing resin comprising, e.g., polyvinyl butyral or polyester. The spacing resin conforms to the microspheres. A reflector sublayer underlies the spacing resin, and can comprise opaque materials such as silver, aluminum, chromium, nickel, or magnesium, or transparent high-index reflector materials such as zinc sulfide, or multilayer reflectors as described in U.S. Pat. No. 3,700,305 (Bingham), the description of which is incorporated herein by reference. Thus, light that enters the retroreflective layer is focused by the glass microspheres through the spacing resin and reflected by the reflector sublayer back through the spacing resin and glass microspheres to an observer. The retroreflective layer can further comprise a backing sublayer, which can optionally bear a heat-activatable or pressure-sensitive adhesive to aid in adhesion to the reflector sublayer.

An optional beadbond sublayer can also be provided. In such an embodiment, glass microspheres can be coated onto the beadbond sublayer, and then spacing resin can be coated onto the glass microspheres. The beadbond sublayer can contain a colored pigment (including black pigment) that gives the retroreflective layer a colored appearance in normal light, and the appearance of a different color, such as silver, in retroreflective light. This is described further in U.S. Pat. No. 2,407,680 (Palmquist et al.), the description of which is incorporated herein by reference. The reverse side of the microspheres can be protected by any suitable protective or sealing material.

An alternative retroreflective layer 80 comprises a multiplicity of cube-corner retroreflective elements instead of glass microspheres and resin. The cube-corner elements can be made of materials such as vinyl, polycarbonate, or acrylic for embossed cube-corner elements, and urethane, epoxy, polyester, and acrylic oligomers and monomers for radiation-cured cube-corner elements. The cube-corner elements typically have three mutually perpendicular faces with surface areas of approximately $1.9 \times 10^{-3}$ mm$^2$ to 0.1 mm$^2$. Cube-corner retroreflective elements can be embossed by a master mold into a sheeting material under suitable temperature and pressure. The elements can also be created by coating a radiation-curable resin onto a master mold, laminating an overlay film under sufficient pressure, and solidifying the resin by radiation curing.

Cube-corner retroreflective elements can optionally have a reflective coating, which can be made of the same materials as those previously described for microsphere retroreflective material and is typically applied on the back surface of the cube corners. A sealant film or adhesive layer can be applied over the reflective coating while still allowing retroreflection. Also, cube-corner retroreflective elements can be used without a reflective coating.

A holographic film and a retroreflective layer can be bonded together by a tie layer. Suitable materials for such a tie layer include primers (e.g., primer coating 70 in FIGS. 2 and 3) or adhesives, either as coatings or as film, such as urethanes, olefins, vinyls, and acrylics. The tie layer can be any appropriate thickness and can be applied either to the holographic film or to the retroreflective layer or both prior to bonding these layers together.

The tie layer can be made of a heat-shrink material, which provides protection against tampering by the application of heat, because the application of a sufficient amount of heat causes the heat-shrink layer to deform. Polyolefin film is a preferred material for the heat-shrink tie layer.

An optional patterned coating layer (e.g., patterned release coating 60 in FIGS. 2 and 3) that either increases or decreases adhesion can be provided at the interface of the holographic and retroreflective layers. A particularly useful application of the patterned layer is one in which this layer is used adjacent to a layer having printed indicia or an arrangement of one or more holographic emblems (e.g., holographic film 55 in FIGS. 2 and 3). When the article is delaminated at the patterned coating layer, a portion of the indicia or emblem(s) remains bonded to each delaminated portion.

An optional indicia pattern can be applied in the same locations as the patterned coating layer described above, or in other locations within the construction. The indicia pattern or logos are preferably printed with colored inks, pearlescent inks, or inks visible under ultraviolet light, or are imaged using toners or dyes in a pattern. These colored indicia are especially useful when printed at some location above the front surface of a retroreflective layer that has a colored beadbond. In normal light, the colored (preferably black) beadbond hides the colored indicia and only the hologram is typically visible, because the hologram detracts from the visibility of the colored indicia. However, under retroreflective lighting conditions, the colored indicia are brightly visible against the background, which is preferably silver, and the hologram is no longer visible. Wide or narrow angular indicia can also be imaged into the microsphere retroreflective layer by, e.g., the laser imaging process generally described in U.S. Pat. Nos. 4,688,894 (Hockert) and 4,200,875 (Galanos), the descriptions of which are incorporated herein by reference. Usually, when this process is used to image enclosed microsphere retroreflective materials with opaque reflectors, the indicia are visible in both normal and retroreflective light. This invention also includes using enclosed microsphere retroreflective material with transparent reflectors with which the indicia are not visible in normal light but are visible only under retroreflection. Thus the indicia are hidden until viewed under retroreflective lighting conditions.

When, e.g., an article for application to the inside of a motor vehicle windshield is desired, the components utilized in addition to components (a) and (b) are preferably light-transmissive (more preferably, transparent), especially when used with a posterior retroreflective layer or a posterior layer bearing indicia which should remain visible from the exterior of the vehicle. When one or more heat-sensitive, e.g., thermoplastic, components are used in such an article, the component(s) are preferably used in combination with both a patterned release coating and a continuous coating of adhesion-promoting primer.

The tamper-indicating article of the invention can, if desired, further comprise at least one liner (e.g., to protect PSA layer 20). Such a liner can be of materials known in the art, such as paper or polymer film (optionally bearing a release coating or having been treated or processed in some manner to enable, e.g., the release of the PSA from the liner). The article of the invention can be prepared using conventional coating, lamination, and/or transfer techniques. The thicknesses of the various component layers can vary widely, depending upon the number and the nature of the particular components, the particular application, and the performance characteristics desired.

Objects and advantages of this invention are further illustrated by the following examples, but the particular materials and amounts thereof recited in these examples, as well as other conditions and details, should not be construed to unduly limit this invention.

EXAMPLES

Test Methods

180° Peel Adhesion Test

Peel adhesion is the force required to remove an adhesive-coated, flexible sheet material from a test panel. Peel adhesion is measured at a specific angle and rate of removal. In the following examples, this peel adhesion force is expressed in Newtons/centimeter width (N/cm) of the coated sheet. Peel adhesion forces measured throughout are initial peel adhesion forces taken at about one minute dwell time, unless indicated to the contrary. These initial peel adhesion forces may not be indicative of aged peel adhesion forces that can be obtained.

Peel adhesion (180°) was measured according to PSTC-1 (Test Methods of the Pressure-Sensitive Tape Council, $9^{th}$ Edition, 1989, Deerfield, Ill., USA). A strip (1.27 centimeter wide) of the adhesive-coated sheet was applied to the horizontal surface of a clean stainless steel test plate with at least 12.7 lineal centimeter of both surfaces being in firm contact. One pass with a 2-kilogram hard rubber roller was used to apply the strip. The free end of the coated strip was doubled back nearly touching itself so the angle of removal was 180°. The free end was attached to the adhesion tester scale. The stainless steel test plate was clamped in the jaws of a tensile testing machine that was capable of moving the plate away from the scale at a constant rate of 30.5 cm/min. The scale reading was recorded in Newtons as the tape was peeled from the glass surface. The data was reported as the average of the range of numbers observed during the test.

Peel Adhesion from Glass at Various Removal Angles

Peel adhesion values were measured as described above with the exception that the equipment configuration was altered so as to allow removal forces to be measured at other peel angles. A glass test plate was anchored in the lower jaw of the tensile testing machine in various configurations so that when the end of the coated strip was pulled by the second opposing jaw of the machine, the strip was removed from the plate at other angles, in addition to the peel angles of 90° and 180° that are most commonly tested. The force required to separate the adhesive-coated strip from the plate was recorded, as well as the elongation during the removal process of the strip. Removal angles of 0°, 45°, 90°, 145°, and 180° were evaluated.

Example 1

A sheet of photocopier paper measuring 5 cm×7 cm was gravure-coated on one side with a checkerboard pattern of a release composition comprising an organopolysiloxane-polyurea copolymer. The organopolysiloxane-polyurea copolymer was the condensation reaction product of an organopolysiloxane diamine with a diisocyanate and a diamine chain extender and was prepared essentially as described in U.S. Pat. Nos. 5,214,119 and 5,290,615, the descriptions of which are incorporated herein by reference. The organopolysiloxane-polyurea was coated from isopropanol solution in such a manner that the single elements of the resulting checkerboard pattern measured 5 mm on each side. The pattern-coated paper was dried at 70° C. for 1 minute.

A sheet of 1.5 mil (38 microns) thick corona-treated, linear low density polyethylene (LLDPE) film, available as XMAX 312.0 LLDPE from Huntsman Packaging, Scunthorpe, UK, was coated on both sides with pressure sensitive adhesive and then cut to the same dimension as the paper described above (5 cm×7 cm). The adhesive on one side of the film was a solvent-based acrylic pressure-sensitive adhesive comprising a terpolymer of 70% by weight isooctylacrylate, 22.5% by weight methyl acrylate, and 7.5% by weight acrylic acid. The adhesive had an inherent viscosity of 0.7 and contained a thermally-activated bisamide crosslinker. (The peel adhesion of this adhesive on a 2 mil (50 microns) thick polyethylene terephthalate (PET) film was evaluated, and a 180° peel adhesion value of 5.6 N/cm was obtained.) The adhesive was coated onto the LLDPE film using a knife coater and was dried in a forced air oven to give a final adhesive coating weight of 40 g/m². A 2 mil (50 microns) thick silicone-coated polyester liner was then laminated to the dried adhesive layer.

The reverse side of the LLDPE film was coated with an organic solution of an acrylic pressure-sensitive adhesive. The adhesive solution was prepared by combining two adhesive compositions in a weight ratio of 11.9 parts Adhesive Composition A (30 parts of the solid components thereof) and 88.1 parts Adhesive Composition B (70 parts of the solid components thereof). (This adhesive solution was also coated on 2 mil (50 microns) thick polyethylene terephthalate (PET) film using a knife-coater to give a final coating weight after drying in a forced air oven of 10 g/m², and a 180° peel adhesion value of 1.4 N/cm was obtained.)

Adhesive Composition A comprised a waterborne acrylic pressure-sensitive adhesive having a 95.5:4.5 isooctyl acrylate:acrylic acid weight ratio, which was prepared essentially by the emulsion polymerization method described in Example 5 of U.S. Pat. No. Re. 24,906 (Ulrich), the description of which is incorporated herein by reference. Following polymerization, the resulting acrylic pressure-sensitive adhesive was recovered from the emulsion and dissolved in an 80/20 mixture of heptane and propyl alcohol to form a 25% by weight solution.

Adhesive Composition B comprised an acrylate microsphere adhesive, which was prepared essentially as described in U.S. Pat. No. 3,691,140 (Silver), the description of which is incorporated herein by reference, using 98% isooctyl acrylate and 2% ammonium acrylate. The microspheres were isolated from the resulting suspension and then dispersed in heptane to form an 8% by weight microsphere dispersion.

The pattern-coated surface of the above-described paper was then laminated to the side of the resulting double-coated LLDPE film bearing the microsphere-containing adhesive to form a simple embodiment of the tamper-indicating article of the invention. The polyester liner was removed from the article, and the resulting exposed adhesive layer was adhered to a sheet of two-layer tempered safety glass and pressed firmly by hand. After 15 minutes, an attempt was made to remove the article from the glass substrate. The edge of the article was lifted slightly and pulled in a direction approximately 90° to the substrate surface. This caused the article to split into two separate parts. One part remained on the substrate, and the other was completely detached.

The part remaining on the substrate comprised the first adhesive layer, the film, the second adhesive layer, and a checkerboard pattern of areas comprising fibers delaminated from the paper. The paper fibers were easily identifiable in areas where no release coating was present. The part which detached completely comprised the patterned release coating and the remainder of the paper. Visual inspection revealed that the paper had been delaminated on one side in a checkerboard pattern.

The part remaining on the substrate was removed in one piece by grasping at its edge and pulling at an angle of about 45 degrees to the surface of the substrate. The part stretched during the removal process but did not break. The pressure-sensitive adhesive bond to the substrate was broken progressively and cleanly and, after removal, no adhesive residue could be seen on the substrate.

A number of double-coated LLDPE films were prepared as described above and were applied to a glass test plate. The peel adhesion values obtained at various removal angles are shown in Table 1.

TABLE 1

| Removal Direction* | Removal Angle (degrees) | Peel Adhesion (N/cm) | Elongation (%) |
| --- | --- | --- | --- |
| MD | 0 | 9.4 | 472 |
| MD | 45 | 7.5 | 441 |
| MD | 90 | 5.9 | 253 |
| CD | 90 | 5.1 | 489 |
| DD | 90 | 5.1 | 406 |
| MD | 135 | 5.5 | 237 |
| MD | 180 | 7.9 | 569 |

*MD = removal by stretching in the machine direction of the film
CD = removal by stretching in the cross direction of the film
DD = removal by stretching in the diagonal direction of the film

Example 2

The rear, non-retroreflective side of a flexible retroreflective sheeting comprising glass beads as reflective elements (available as Scotchlite™ VP5500 Reflective Sheeting from 3M Company, St. Paul, Minn.) was heat laminated to a 25 micron thick opaque white polyethylene terephthalate (PET) film to protect its exposed aluminum reflector layer. The sheeting was then coated on its front retroreflective surface with a continuous tie layer of polyurethane resin (available as Neorez™ R960 from Zeneca Resins, Waalwijk, The Netherlands). The water-based resin composition was applied by gravure coating and dried at 80° C. for 1 minute to a dry thickness of about 4 microns. A checkerboard pattern of the release composition described in Example 1 was then applied over the resulting tie layer by gravure coating, essentially as described in Example 1.

Next, a continuous layer of transparent solvent-based ink (available as Scotchlite™ Transparent Ink 1900 (Blue- Violet) from 3M Company, St. Paul, Minn.) was then applied over the patterned release coating by screen printing. The resulting ink coating was dried for 40 seconds at 60° C. to give a dry thickness of about 10 microns.

The double-coated LLDPE film of Example 1 was then adhered to the laminate comprising reflective sheeting, tie layer, patterned release coating, and ink layer. The side of the film bearing microsphere-containing adhesive was bonded to the ink layer using a mechanical laminator at 23° C. to form a retroreflective tamper-indicating article. The protective PET film was removed from the article, and the resulting exposed adhesive layer was adhered to a sheet of two-layer tempered safety glass and pressed down firmly by hand. After 15 minutes, an attempt was made to remove the article from the glass substrate. The edge of the article was lifted slightly and pulled in a direction approximately 90 degrees to the substrate surface. The article could not be removed in one piece. Rather, it exhibited intralayer failure and separated into two parts, one remaining bonded to the substrate and the other detaching completely.

The part that remained bonded to the substrate comprised the double-coated LLDPE film and easily identifiable portions of the ink layer corresponding to the areas bearing a release coating. The part that detached completely from the substrate comprised the reflective sheeting, the tie layer, the patterned release coating, and portions of the ink layer corresponding to areas where the release coating was absent. The damaged ink layer thus provided a visual indication of tampering. The part of the article that remained bonded to the glass substrate was then removed from the glass in one piece by grasping the part at its edge and pulling at an angle of about 45 degrees to the substrate surface. The part stretched during the removal process but did not break. The pressure-sensitive adhesive bond to the glass substrate was broken progressively and cleanly, and, after removal, no adhesive residue could be seen on the substrate.

Example 3

The sheeting of Example 2 was coated on its front retroreflective surface with a continuous polyurethane tie layer and a pattern coating of release composition, essentially as in Example 2. A thin transparent holographic film (available from Crown Roll Leaf, Peterson, N.J.) was then laminated over the patterned release coating using a heated laminator (available from Sallmetal, Raalte, The Netherlands) at 100° C. The holographic film comprised a polyester release liner, a polymethylmethacrylate-based structured layer, a high refractive index zinc sulfide reflector, and a thin adhesive layer. After lamination, the polyester liner was removed. A continuous layer of transparent solvent-based ink (available as Scotchlite™ Transparent Ink 1900 (Blue-Violet) from 3M Company, St. Paul, Minn.) was then applied over the thin transparent holographic layer by screen printing. The resulting ink coating was dried for 40 seconds at 60° C. to give a dry coating thickness of about 10 microns.

The double-coated LLDPE film of Example 1 was then adhered to the laminate comprising reflective sheeting, tie layer, patterned release coating, holographic film, and ink layer. The side of the film bearing microsphere-containing adhesive was bonded to the ink layer using a mechanical laminator at 23° C. to form a tamper-indicating article. The protective PET film was removed from the article, and the resulting exposed adhesive layer was adhered to a sheet of two-layer tempered safety glass and pressed firmly by hand. After 15 minutes, an attempt was made to remove the article from the glass substrate. The edge of the article was lifted slightly and pulled in a direction approximately 90 degrees to the substrate surface. The article could not be removed in one piece and separated into two parts, one remaining bonded to the glass substrate and the other detaching completely.

The part that remained bonded to the glass substrate comprised the double-coated LLDPE film and easily identifiable portions of both the ink layer and the holographic film, these portions corresponding to the areas where the release coating was present. The part that detached completely from the glass substrate comprised the reflective sheeting, the tie layer, the patterned release coating, and portions of both the ink layer and the holographic film, these portions corresponding to areas where the release coating was absent. The damaged ink layer thus provided a visual indication of tampering.

The part that remained bonded to the glass substrate was then removed from the glass in one piece by grasping the part at its edge and pulling at an angle of about 45 degrees to the substrate surface. The part stretched during the removal process but did not break. The pressure-sensitive adhesive bond to the glass substrate was broken progressively and cleanly and, after removal, no adhesive residue could be seen on the substrate.

A second tamper-indicating article was prepared essentially as described above in this Example 3 and was adhered to a glass substrate and allowed to remain there for 40 days at 70° C. to simulate long-term exposure to heat on a glass windshield. Attempts to remove the article resulted in intralayer failure and delamination as described above. Tampering was evident, as both the hologram and the ink layer were damaged during the removal process.

Example 4

Example 3 was repeated with the exception that the double-coated LLDPE film bore the same acrylic-based pressure-sensitive adhesive on both sides. The adhesive comprised a copolymer of isooctylacrylate and acrylic acid in a weight ratio of 95.5 to 4.5. One hundred parts by weight of the copolymer was tackified with 25 parts by weight of a highly stabilized rosin ester resin (available as Foral™ 85 from Hercules, Rijswijk, The Netherlands) Differential adhesion was provided by using a higher coating weight of adhesive on one side of the film than on the other. The coating on one side (the side to be used for attachment to a substrate) had a thickness of 100 microns. (Such an adhesive coating on a 2 mil (50 microns) thick polyethylene terephthalate (PET) film exhibited a 180° peel adhesion value of 7.5 N/cm.) The adhesive coating on the opposite side of the film had a thickness of 50 microns. (Such an adhesive coating on a 2 mil (50 microns) thick polyethylene terephthalate (PET) film exhibited a 180° peel adhesion value of 4.0 N/cm.)

The resulting double-coated LLDPE film was then adhered to the laminate of Example 3 comprising retroreflective sheeting, a tie layer, a patterned release coating, holographic film, and an ink layer. The side of the film bearing the less thick adhesive coating was bonded to the ink layer using a mechanical laminator at 23° C. to form a tamper-indicating article. The article was adhered to a glass substrate, and the behavior of the article on attempted removal from the substrate was similar to that described in Example 3. The part remaining on the substrate was removed by grasping the part at its edge and pulling at an angle of about 90° to the substrate surface. The part stretched but did not break during the removal process. After the adhesive bond to the substrate had been completely broken, no adhesive residue was visible on the substrate.

Example 5

A 220 micron thick sheet of styrene-ethylene-co-butylene-styrene block copolymer (SEBS), available from Shell Chemicals as Kraton™ G-1657, was prepared by standard twin screw extrusion techniques. The resulting elastic sheet was coated on both sides with a rubber resin-based pressure-sensitive adhesive comprising 100 parts by weight styrene-isoprene-styrene synthetic block polymer (available as Kraton™ 1107 from Shell chemicals), 129 parts by weight C5 aliphatic tackifier resin (available as Escorez™ 1310 from Exxon, Belgium), 54 parts by weight polyterpene resin (available as Zonarez™ A25 from Arizona Chemicals), and 3 parts antioxidant (available as Irganox™ 1076 from Ciba Geigy, Basel, Switzerland). The adhesive was coated on one side of the SEBS sheet at a thickness of 35 microns and on the other side at a thickness of 19 microns. A silicone-coated polyester liner was laminated to the thicker adhesive coating. The peel adhesion of each adhesive coating to a stainless steel substrate was measured and found to be 6.8 N/cm (19 micron layer) and 8.5 N/cm (35 micron layer).

The resulting double-coated sheet was laminated to form a tamper-indicating article by bonding the thinner adhesive coating of the sheet to the ink layer of a retroreflective laminate of the type described in Example 3. This laminate comprised (in order) retroreflective sheeting, a continuous tie layer, a patterned release coating, a thin transparent holographic film, and a continuous layer of ink. The polyester liner was removed, and the article was pressed firmly against a clean glass plate. On attempted removal from the substrate, the article delaminated in essentially the same manner as described in Example 3, leaving one part of the article on the substrate.

The part of the article that remained bonded to the substrate consisted of the double-coated SEBS sheet and a checkerboard pattern of ink/hologram fragments corresponding to the areas where the release coating was present. The part of the article that detached completely from the substrate comprised retroreflective sheeting, the tie layer, the patterned release coating, and portions of both the ink layer and the holographic film corresponding to areas where no release coating was present. The part of the article that remained bonded to the substrate could be removed cleanly from the substrate by grasping the part at one edge and stretching until it separated cleanly from the substrate surface.

Example 6

Example 5 was repeated with the exception that a different elastomeric sheet was used as a carrier for the adhesive layers. A 50 micron thick sheet of semi-transparent anisotropically elastic film comprising 60 parts styrene-isoprene-styrene triblock polymer (available commercially as Vector™ 4111D from Deutsche Exxon Chemicals GmbH) and 40 parts polypropylene (density of 0.905 g/cm$^3$, available as PPH 7060S from Fina Chemicals, Belgium) was prepared by an extrusion process. The resulting elastic sheet comprised insoluble polypropylene fibers extending in the plane of the sheet in the down web direction, embedded in an elastomeric matrix. The anisotropic sheet was extensible and elastic in the cross web direction, but had a lesser extensibility and elasticity in the down web direction.

The elastic sheet was coated on both sides with the rubber resin-based pressure-sensitive adhesive of Example 5 and was laminated to the retroreflective laminate employed in Example 3, comprising retroreflective sheeting, a continuous tie layer, a patterned release coating, a thin holographic film, and a continuous layer of ink. The thinner layer of pressure-sensitive adhesive on the elastic carrier was laminated to the ink layer of the retroreflective laminate. The resulting tamper-indicating article was adhered to a glass substrate. When attempts were made to remove the article from the substrate, the article delaminated. The part of the article that remained bonded to the substrate could be removed cleanly from the substrate by pulling the edge of the part and stretching until the part separated from the substrate surface.

Example 7

A tamper-indicating article was prepared using a pressure-sensitive adhesive (PSA) film (comprising no carrier for the adhesive), rather than the carrier-comprising double-coated film or sheet of the above Examples. The PSA film was an opaque film of synthetic rubber resin-based adhesive (available as Power Strips™ from Beiersdorf AG, Hamburg, Germany). The PSA film was homogeneous, and its two adhesive surfaces were covered with protective liners. One of the liners was removed from the film, and the exposed adhesive face was laminated to the retroreflective laminate of Example 3 (comprising (in order) retroreflective sheeting, a continuous tie layer, a patterned release coating, a thin transparent holographic film, and a continuous layer of transparent ink).

The second protective liner was removed from the resulting tamper-indicating article, and the article was adhered to a glass substrate. After 15 minutes, an attempt was made to remove the article. The article exhibited intralayer failure and separated into two parts, one part detaching completely and the other remaining bonded to the substrate surface. The part remaining on the substrate surface comprised the PSA film, the complete layer of ink, and a checkerboard pattern of the holographic film corresponding to the areas where the release coating was present. The checkerboard pattern of the damaged holographic film could be easily seen when light was reflected from the surface (of the completely detached part of the article) at certain angles. The part of the article that detached consisted of the retroreflective sheeting, the continuous tie layer, the checkerboard patterned release coating, and a checkerboard pattern of the holographic film corresponding to areas where the release coating was absent. The part of the article remaining on the substrate could be removed in one piece by pulling on a grasping tab provided at one end of the PSA film at an angle of about 30 degrees to the substrate surface.

Example 8

Example 3 was repeated with the exception that a double-coated LLDPE film was prepared by coating both sides of LLDPE film with the same acrylic-based pressure-sensitive adhesive composition. The adhesive comprised a tackified copolymer of isooctylacrylate and acrylic acid in a weight ratio of 95.5 to 4.5. One hundred parts by weight of the copolymer was tackified with 25 parts by weight of a highly stabilized rosin ester resin (available as Foral™ 85 from Hercules, Rijswijk, The Netherlands). Differential adhesion was provided by using a higher coating weight of adhesive on one side of the film than on the other.

A tamper-indicating article was prepared by laminating the resulting double-coated film to the retroreflective laminate of Example 3 (comprising retroreflective sheeting, a continuous tie layer, a patterned release coating, a thin transparent holographic film, and a continuous layer of transparent ink) by bonding the ink layer of the laminate to the side of the double-coated film bearing a lower coating weight of adhesive. The resulting article was applied to a glass substrate, and, upon attempted removal, the article delaminated. The part remaining attached to the substrate comprised the double-coated film and a pattern of fragments of ink and holographic film. This part was removable by grasping it and stretching it to break the adhesive bond to the substrate surface.

Example 9

Example 8 was repeated with the exception that the LLDPE carrier film was replaced with a sheet of low density polyethylene (LDPE) having a thickness of 28 microns and a density of 0.92 g/cm$^3$ (available from Klerk's, Noordwijkerhout, The Netherlands). The resulting article was applied to a glass substrate, and, upon attempted removal, the article delaminated. The part remaining attached to the substrate comprised the double-coated film and a pattern of fragments of ink and holographic film. This part was removable by grasping it and stretching it to break the adhesive bond to the substrate surface.

Example 10

Example 3 was repeated with the exception that the flexible retroreflective sheeting was replaced by a 2 mil (50 microns) thick clear polyethylene terephthalate (PET) film. The clear PET was provided with a continuous tie layer, a patterned release coating, a thin holographic film, and a continuous ink layer, essentially as described in Example 3. The resulting tamper-indicating article was translucent when adhered to a glass substrate. Upon attempted removal, the article delaminated. The part remaining bonded to the substrate was cleanly removable by stretching.

Example 11

Example 3 was repeated with the exception that the flexible retroreflective sheeting of Example 3 comprising glass beads as the reflective elements was replaced by a flexible retroreflective sheeting comprising cube-cornered elements as reflective elements (available as Flexible Diamond Grade™ Reflective Sheeting 973 from 3M Company, St. Paul, Minn.). The resulting article was applied to a glass substrate, and, upon attempted removal, the article delaminated. The part remaining attached to the substrate comprised the double-coated film and a pattern of fragments of ink and holographic film. This part was removable by grasping it and stretching it to break the adhesive bond to the substrate surface.

Various modifications and alterations of this invention will become apparent to those skilled in the art without departing from the scope and spirit of this invention.

What is claimed is:

1. A tamper-indicating article comprising (a) a film of pressure-sensitive adhesive or a pressure-sensitive adhesive-coated tape that can be removed from a substrate surface, without exhibiting cohesive failure, by stretching said film or said tape; and (b) at least one damageable layer that exhibits cohesive failure when an attempt is made to peel said article from said substrate surface; wherein said attempt to peel said article from said substrate surface also results in the separation of said components (a) and (b), with said component (a) remaining bonded to said substrate surface.

2. A tamper-indicating article comprising (a) a pressure-sensitive adhesive film or pressure-sensitive adhesive-coated tape that can be cleanly removed from a substrate surface, without exhibiting cohesive failure, by stretching said film or said tape; and (b) at least one damageable layer; wherein the cohesive strength of said damageable layer is less than the adhesive strength between said substrate surface and said film or said tape, and said adhesive strength is less than the cohesive strength of said film or said tape; and wherein an attempt to peel said article from said substrate surface results in the separation of said components (a) and (b), with said component (a) remaining bonded to said substrate surface.

3. The article of claim 1 wherein said film or said tape can be removed from said substrate surface by stretching said film or said tape at an angle of about 45 degrees to said substrate surface.

4. The article of claim 1 wherein component (a) is a pressure-sensitive adhesive-coated tape.

5. The article of claim 1 wherein said film or said tape comprises a pressure-sensitive adhesive selected from the group consisting of acrylic, block copolymer, rubber resin, poly(alpha olefin), and silicone pressure-sensitive adhesives.

6. The article of claim 5 wherein said pressure-sensitive adhesive is selected from the group consisting of acrylic pressure-sensitive adhesives and silicone pressure-sensitive adhesives.

7. The article of claim 1 wherein said tape comprises a carrier to the selected from the group consisting of films of silicone polymers; films of polyurethanes; films of polymers comprising polymerized units derived from one or more olefin monomers, from one or more acrylic monomers, from one or more vinyl monomers, and from mixtures thereof; and films of blends of said polymers.

8. The article of claim 7 wherein said polymers are selected from the group consisting of polyolefins and block copolymers.

9. The article of claim 1 wherein said tape comprises (a) a carrier having a lengthwise elongation at break of from about 50 to about 1200 percent, a Young's modulus of at least about 2500 psi (17.2 N/mm$^2$), but less than about 72,500 psi (500 N/mm$^2$), and a tensile strength at break that is sufficiently high that said carrier does not rupture during peeling of said tape from said substrate surface; and (b) a pressure-sensitive adhesive on at least a portion of at least one major surface of said carrier; said tape being capable of being firmly bonded to said substrate surface and further capable of being removed therefrom by being stretched at an angle of about 45 degrees to said substrate surface.

10. The article of claim 9 wherein said carrier has less than about 50 percent elastic recovery after stretching.

11. The article of claim 1 wherein said damageable layer exhibits said cohesive failure by being at least partially destroyed or irreversibly deformed.

12. The article of claim 1 wherein said damageable layer is selected from the group consisting of frangible materials, papers, indicia, hot-melt adhesives, pressure-sensitive adhesives, and irreversibly deformable polymeric films.

13. The article of claim 1 wherein said damageable layer comprises indicia.

14. The article of claim 1 wherein said damageable layer comprises holographic film.

15. The article of claim 1 further comprising a patterned release coating.

16. The article of claim 1 further comprising a primer coating.

17. The article of claim 1 further comprising a retroreflective layer.

18. A tamper-indicating article comprising (a) a pressure-sensitive adhesive-coated tape comprising (i) a carrier having first and second major surfaces and having a lengthwise elongation at break of from about 50 to about 1200 percent, a Young's modulus of at least about 2500 psi (17.2 N/mm$^2$), but less than about 72,500 psi (500 N/mm$^2$), and a tensile strength at break that is sufficiently high that said carrier does not rupture during peeling of said tape from a substrate surface; and (ii) pressure-sensitive adhesive on at least a portion of said first and second major surfaces of said carrier; said tape being capable of being firmly bonded to said substrate surface and further capable of being removed therefrom by being stretched at an angle of about 45 degrees to said substrate surface; (b) a damageable layer that exhibits cohesive failure when an attempt is made to peel said article from said substrate surface, said damageable layer comprising indicia; (c) a patterned release coating; and (d) a retroreflective layer; wherein said attempt to peel said article from said substrate surface also results in the separation of said components (a) and (b), with said component (a) remaining bonded to said substrate surface.

19. The article of claim 18 wherein said carrier has less than about 50 percent elastic recovery after stretching.

20. The article of claim 18 wherein said tape is capable of being removed from said substrate surface by being stretched in a direction substantially parallel to said substrate surface.

21. The article of claim 18 wherein said pressure-sensitive adhesive comprises acrylic pressure-sensitive adhesive.

22. The article of claim 20 wherein said first and second major surfaces of said carrier each bear a different said acrylic pressure-sensitive adhesive.

23. The article of claim 18 further comprising a second damageable layer, said second damageable layer comprising a holographic film.

24. The article of claim 23 further comprising a primer coating.

25. The article of claim 18 wherein said carrier comprises linear low density polyethylene.

26. A substrate bearing the article of claim 1.

27. A tamper-indicating article comprising (a) a film of pressure-sensitive adhesive or a pressure-sensitive adhesive-coated tape that can be removed from a substrate surface by stretching the film or tape; and (b) at least one damageable layer that will separate from component (a) and be sufficiently damaged to provide an indication of tampering when an attempt is made to peel the article from the substrate surface, and wherein after such an attempt component (a) can be stretched and cleanly removed from the substrate without leaving adhesive residue.

28. The article of claim 27 wherein component (a) has less than about 50 percent elastic recovery after it is stretched and removed.

29. The article of claim 27 wherein component (a) comprises a tape that can be removed from the substrate surface by stretching the tape manually and without rupturing the tape during removal.

30. The article of claim 27 wherein during such an attempt the article exhibits intralayer failure and separates into two parts, one remaining bonded to the substrate and the other detaching completely.

31. The article of claim 27 wherein after such an attempt component (a) can be removed in one piece by grasping component (a) and pulling at an angle of less than 45 degrees to the substrate surface.

32. The article of claim 30 wherein the substrate comprises a glass surface, component (a) stretches during removal but does not break, and the bond of the pressure-sensitive adhesive to the glass surface breaks progressively and cleanly.

* * * * *

UNITED STATES PATENT AND TRADEMARK OFFICE
CERTIFICATE OF CORRECTION

PATENT NO. : 6,372,341 B1
DATED : April 16, 2002
INVENTOR(S) : Jung, Dieter

It is certified that error appears in the above-identified patent and that said Letters Patent is hereby corrected as shown below:

<u>Title page,</u>
Item [54], delete "TAMPA" and insert in place thereof -- TAMPER --.

Signed and Sealed this

Twenty-seventh Day of August, 2002

Attest:

Attesting Officer

JAMES E. ROGAN
*Director of the United States Patent and Trademark Office*